No. 671,726. Patented Apr. 9, 1901.
R. A. GRAY.
SEED DRILL WITH FERTILIZER ATTACHMENT.
(Application filed July 3, 1900.)
(No Model.)
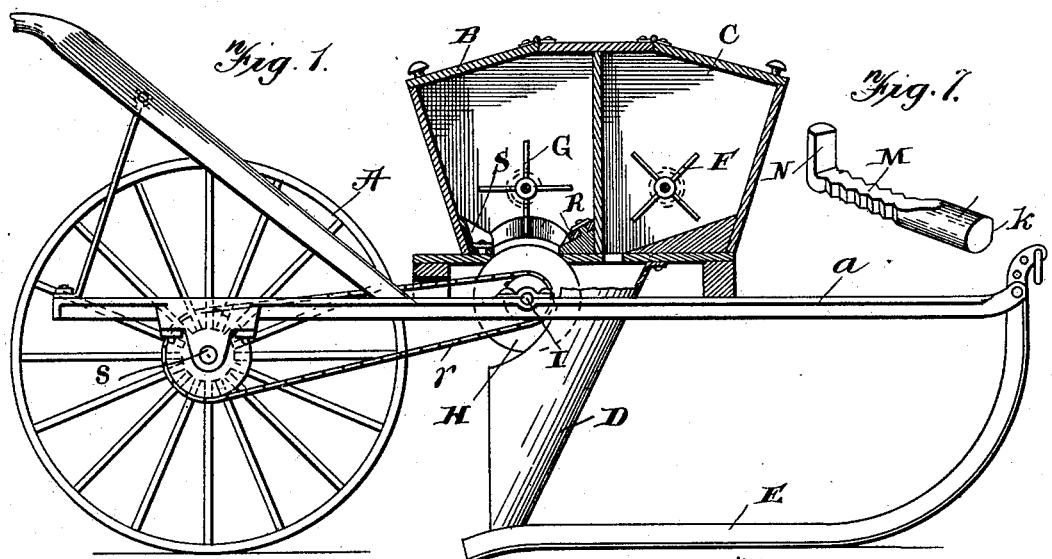
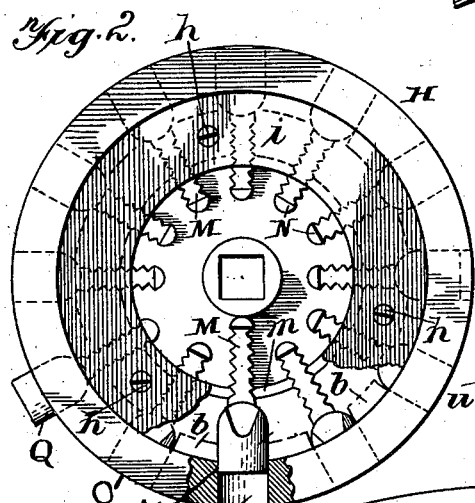
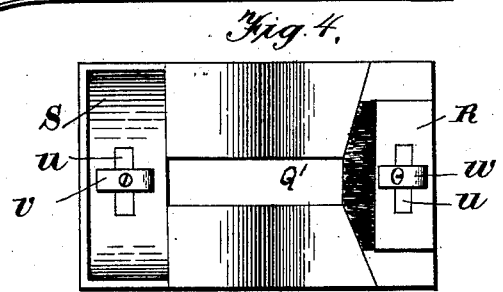
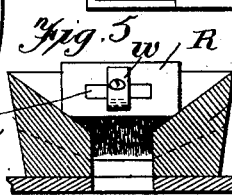
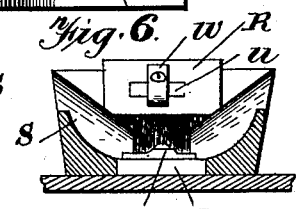
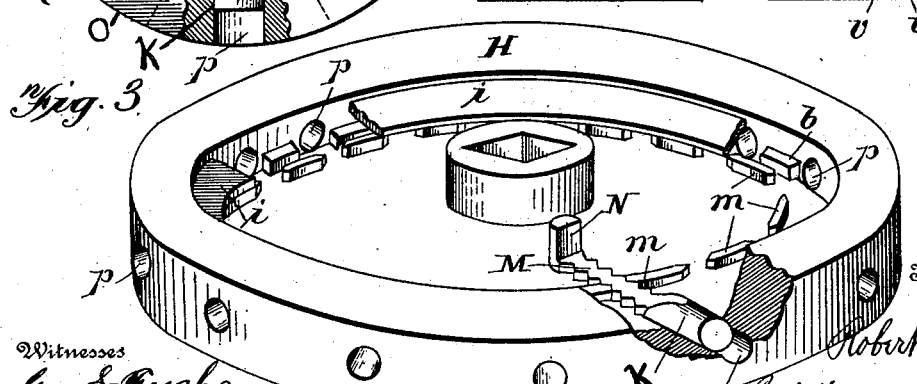
Witnesses
Geo. E. Frech.
M. A. Leonard.
Inventor
Robert A. Gray.
By Hensey & Robinson
Attorneys

UNITED STATES PATENT OFFICE.

ROBERT A. GRAY, OF GREENSBORO, NORTH CAROLINA.

SEED-DRILL WITH FERTILIZER ATTACHMENT.

SPECIFICATION forming part of Letters Patent No. 671,726, dated April 9, 1901.

Application filed July 3, 1900. Serial No. 22,452. (No model.)

*To all whom it may concern:*

Be it known that I, ROBERT A. GRAY, a citizen of the United States, residing at Greensboro, in the county of Guilford and State of North Carolina, have invented certain new and useful Improvements in a Combined Cotton and Corn Drill with Fertilizer Attachment; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a combined cotton and corn drill with fertilizer attachment; and it consists of improvements in the method of distributing the grain at consecutive intervals. In my invention this is accomplished by certain regulating improvements, all of which are shown in the drawings by similar letters applied to the different figures.

In the accompanying drawings, Figure 1 is a side view of the combined cotton and corn drill with fertilizer attachment, wherein the seed and fertilizer boxes are shown in section. Fig. 2 is a top view, with dotted lines showing the different adjustments that can be made in the seed-wheel. Fig. 3 is a perspective, part of which is broken away to show the adjusting devices and part of the holding-ring. Figs. 4, 5, and 6 are details of a false bottom to be put within the grain-chamber for causing a constant flow of grain toward the wheel. Fig. 7 is a detail of one of the adjustable lugs.

The operation of the invention and improvements is as follows: The wheel A of the drill is journaled in the frame and is connected by means of a sprocket chain or shaft to an axle or shaft journaled within the frame $a$, immediately beneath the seedbox and given rotation to the said shaft or axle. Mounted on this axle is the seed-wheel H, and by any suitable connection (not shown in the drawings) a rotary motion is transmitted from the said axle to the axles journaled in the seed and fertilizer hoppers above. A chute D is arranged so that the fertilizer and the seed can both be carried into it and drop into the base of the furrow cut by runner, (denominated as E.)

In Figs. 2 and 3, showing the seed-wheel in perspective and in a top diagrammatic view, the adjustable lugs K are held in place by the corrugations M upon the same and are prevented from moving in or out when once set by engaging the lugs $m$, raised from the inner surface of the solid seed-wheel H, constructed, preferably, of metal. This engagement is made secure by an iron ring $i$, which rests upon the top of the lugs $m$ and is attached rigidly by means of screws $h$ to the seed-wheel H, becoming a part of the same and revolving with it.

At the end of the lug K, as shown in Fig. 7, a raised point N left upon the same keeps the lug K from slipping out should the corrugations M be drawn beyond the circular line of lugs $m$, projecting from the casting H. The corrugations on K allow the following adjustments, which are shown in Fig. 2: In the position $o$ the lug is shown flush with the surface of the seed-wheel H, which therefore does not allow the feeding of any seed through the hopper B, but does not interfere with the distribution of the fertilizer from the hopper C through suitable adjustable openings in the base of the said hopper, in which any modern fertilizer attachment can be used. In the position $p$ the lug is shown with the corrugations so placed as to leave a recess in the edge of the seed-wheel H, which will carry one or more grains of corn. A detachable brush R, trailing upon the periphery of the seed-wheel, brushes away the extra grains of corn or other cereal being planted, so that projecting grains will not be ground up, and serves also as a shield for the opening made by a false bottom, not fitting closely up against the wheel-periphery.

By adjusting the lugs K in the recesses at the rim of the wheel H the depth of the said recesses may be regulated and adapted to receive the seed or corn to be dropped and planted. If the grains are large, the lugs K are adjusted so as to make the recesses deep, and the same adjustment would be made should it be desired to drop a number of grains at one time. In this wheel (given as H in the drawings) the collar or holding-ring plate $i$ being removed by the taking out of the screws $h$ allows the adjusting-lugs K to be raised clear of the engaging lugs into which the corrugations of the lug K fit, whereat the lug K can be pushed in or out and set to the depth of recess desired. In the position Q it is shown projecting, as is necessary in the planting of cotton-seed, while in p the lug is shown drawn in, so that it can be utilized for the planting of corn. In the manufacture of the lugs K, I do not restrict myself to any shape of end, but prefer to make them round, as indicated in the drawings.

The false bottom used in connection with the brush attachment in converting the cotton-planter into a corn planter or drill has, as is shown in Fig. 4, a turn-button v, that rises through it and fastens it securely to the bottom of the hopper. The surface R is hollowed, so that the cut-off or wiping brush will stay in its proper position with attachment-button w and lug u and rest even with the surface of the seed-wheel to keep back the flow of grain not intended to be dropped. I do not limit myself to any particular attachment for the said brush, any suitable means being sufficient. The end carrying the brush R (shown in Figs. 4, 5, and 6) is slanting and has a projecting lug u with button w in its top. The aperture fitting over this lug allows the button to anchor the brush as securely in place as desired, a loose adjustment to allow for wear being desirable with the planting of some seed. It is thus readily observed that the continuous action of the wheel would result in cotton-seed being dropped at regular intervals. The false bottom shown in Fig. 5 is adapted to be placed in the corn and cotton hopper B for the planting of corn. It is of a peculiar design, the curves being such as to trend the flow of grain into the recess of the seed-wheel H. Within the center of the false bottom is a recess Q', exactly fitting the wheel and allowing ordinarily, when the lugs K are adjusted below the wheel periphery, the surface of the wheel to run flush with the sides of the aperture, thereby keeping any grain from being fed except through the recess in the periphery of the seed-wheel H.

In the construction of this combined cotton and corn drill with fertilizer attachment it is obvious that any suitable construction of chain or cog gearing between the axle s and the axle I can be utilized, and I do not specify any particular material for the grain and fertilizer hoppers, sheet-iron or wood being preferable, however. The seed-wheel H is preferably made of cast iron or steel, also its inclosing collar and lugs. The false bottom can be made of wood or other material or of metal. I do not limit myself to the particular design of wheels shown, but prefer to use a chute of the form as shown, trending obliquely from the seed and fertilizer drop openings toward the rear, and propose to construct the said chute of iron, plate-iron, or any other suitable material, not limiting myself in this application to any particular material.

Having thus described my invention, what I claim is—

1. A planter consisting of a hopper suitably mounted, a wheel entering said hopper, said wheel being hollowed out on one side, the rim of said wheel having a radially-extending aperture leading from the periphery to the hollow interior, fixed lugs located in the hollow of said wheel, an adjustable lug located in said aperture, the shank of said adjustable lug entering the hollow interior of the wheel, said shank being provided with corrugations on opposite edges, the fixed lugs in the wheel engaging said corrugations and holding the adjustable lug in position.

2. A planter consisting of a hopper suitably mounted, a wheel entering said hopper, said wheel being hollowed out on one side, the rim of said wheel having a radially-extending aperture leading from the periphery to the hollow interior, fixed lugs located in the hollow of said wheel, an adjustable lug located in said aperture, the shank of said adjustable lug entering the hollow interior of the wheel, said shank being provided with corrugations on opposite edges, the fixed lugs in the wheel engaging said corrugations, a part passing over said shank and being located within the hollow of the wheel and adapted to retain the adjustable lug in position between the fixed lugs.

3. A planter consisting of a hopper suitably mounted, a wheel entering said hopper, said wheel being hollowed out on one side, the rim of said wheel having a series of radially-extending apertures leading from the periphery to the hollow interior, fixed lugs located in the hollow of said wheel, adjustable lugs located in said apertures, the shank of each said adjustable lug entering the hollow interior of the wheel, each said shank being provided with corrugations on opposite edges, the fixed lugs in the wheel engaging said corrugations, an annular ring located within the hollow of the wheel and passing over the shanks of the adjustable lugs and adapted to hold the same in position between the fixed lugs.

4. A planter consisting of a hopper suitably mounted, a wheel entering said hopper, said wheel being hollowed out on one side, the rim of said wheel having a series of radially-extending apertures leading from the periphery to the hollow interior, fixed lugs located in the hollow of said wheel, adjustable lugs located in said apertures, the shanks of each said adjustable lug entering the hollow interior of the wheel, each said shank being provided with corrugations on opposite edges, and having a raised point at its inner end; the fixed lugs in the wheel engaging said corrugations, an annular ring located within the hollow of the wheel, and passing over the shanks of the adjustable lugs and adapted to hold the same in position between the fixed lugs.

In testimony whereof I affix my signature in presence of two witnesses.

ROBERT A. GRAY.

Witnesses:
CLINTON M. STAHL,
M. A. LEONARD.